(12) United States Patent
Fukuoka et al.

(10) Patent No.: US 8,529,726 B2
(45) Date of Patent: Sep. 10, 2013

(54) METHOD FOR PRODUCING HOLLOW PRODUCT

(75) Inventors: Terukuni Fukuoka, Kanagawa (JP); Keiichi Hosoda, Kanagawa (JP)

(73) Assignee: Nippi Corporation, Kanagawa (JP)

( * ) Notice: Subject to any disclaimer, the term of this patent is extended or adjusted under 35 U.S.C. 154(b) by 0 days.

(21) Appl. No.: 13/513,009

(22) PCT Filed: Dec. 8, 2009

(86) PCT No.: PCT/JP2009/070538
§ 371 (c)(1),
(2), (4) Date: Jun. 26, 2012

(87) PCT Pub. No.: WO2011/070649
PCT Pub. Date: Jun. 16, 2011

(65) Prior Publication Data
US 2012/0267040 A1    Oct. 25, 2012

(51) Int. Cl.
*B29C 65/00* (2006.01)
(52) U.S. Cl.
USPC ............ 156/286; 156/87; 156/285; 156/287; 156/381; 156/382; 264/101; 264/102
(58) Field of Classification Search
USPC ................... 156/87, 285, 286, 287, 292, 312, 156/381, 382; 264/101, 102, 257, 571
See application file for complete search history.

(56) References Cited

U.S. PATENT DOCUMENTS

| 7,052,572 | B2 | 5/2006 | Miura et al. | |
| 7,138,031 | B2 * | 11/2006 | Erickson et al. | 156/285 |
| 2003/0034588 | A1 | 2/2003 | Miura et al. | |
| 2003/0188821 | A1 * | 10/2003 | Keller et al. | 156/94 |

FOREIGN PATENT DOCUMENTS

| JP | 1-176548 | 7/1989 |
| JP | 6-190956 | 7/1994 |
| JP | 9 156000 | 6/1997 |
| JP | 2003-71864 | 3/2003 |

* cited by examiner

*Primary Examiner* — John Goff
*Assistant Examiner* — Hannuri L Kwon
(74) *Attorney, Agent, or Firm* — Jordan and Hamburg LLP

(57) ABSTRACT

A method for producing a hollow product comprises a film arrangement step wherein a film is arranged on a fiber layer; a molded body arrangement step wherein a molded body having a recess is arranged on the film after the film after the film arrangement step in such a manner that the opening of the recess faces the film; the gas present between the fiber layer and the film is evacuated; the gas present between the film and the molded body is evacuated; a film-molded body bonding step wherein the film and the molded body are bonded together after the step of gas evacuation from between the film and the molded body; and a fiber layer-film bonding step wherein the fiber layer and the film are bonded together after the step of gas evacuation from between the fiber layer and the film.

14 Claims, 3 Drawing Sheets

METHOD FOR PRODUCING HOLLOW PRODUCT

BACKGROUND OF THE INVENTION

The present invention relates to a hollow body product, such as a hollow body product in which a fiber-reinforced resin plate having a concave part and a flat fiber-reinforced resin plate are bonded together and integrated.

A hollow body product such as a pipe can be formed by using a core made of metal or rubber.

However, some types of hollow body product, such as the one used for a landing gear door of an aircraft (see FIG. 3 (plan view) and FIG. 4 (A-A cross-sectional view)) cannot be formed by the method using a core since the core which has been used cannot be taken out.

Nevertheless, even hollow body products like the one shown in FIGS. 3 and 4 can be formed by the method if the core is made of a water-soluble material. This is because the core can be discharged from the hollow part of the product by supplying water to the inside of the hollow part through a hole connecting to the hollow part and causing the core to be dissolved in the supplied water. However, the core is necessary even in this case and the production cost is necessitated to increase correspondingly.

SUMMARY OF THE INVENTION

Incidentally, it is possible to produce a hollow body product like the one shown in FIGS. 3 and 4 even without using a core if a particular method, bonding an upper-face plate 6 made of fiber-reinforced resin (upper-face plate having a concave part 6a) and a lower-face plate 2 made of fiber-reinforced resin (flat lower-face plate) together, is employed.

However, this method has gradually proved to be complicated and troublesome.

In this method, a gas discharging process using a bagging film has to be carried out in a step for forming the upper-face plate 6 made of fiber-reinforced resin and having the concave part 6a, in a step for forming the flat lower-face plate 2 made of fiber-reinforced resin, and in a step for bonding the upper-face plate 6 and the lower-face plate 2 together. Thus, this manufacturing method has been complicated and troublesome.

It is therefore the primary object of the present invention to provide a technique with which hollow body products can be manufactured with ease.

The above object is achieved by a manufacturing method of a hollow body product, comprising:

a film arrangement step in which a film is arranged on a fiber layer;

a shaped member arrangement step in which a shaped member having a concave part is arranged on the film after the film arrangement step so that an opening of the concave part faces the film;

a fiber layer/film gas discharging step in which gas existing between the fiber layer and the film is discharged;

a film/shaped member gas discharging step in which gas existing between the film and the shaped member is discharged;

a film/shaped member joining step in which the film and the shaped member are joined together after the film/shaped member gas discharging step; and a fiber layer/film joining step in which the fiber layer and the film are joined together after the fiber layer/film gas discharging step.

In the above manufacturing method of a hollow body product, the object is achieved preferably by a manufacturing method wherein the discharging of the gas in the gas discharging steps is executed so that a condition (pressure P1 of the gas existing between the fiber layer and the film)<(pressure P2 of the gas existing between the film and the shaped member) is satisfied.

In the above manufacturing method of a hollow body product, the object is achieved preferably by a manufacturing method wherein the fiber layer/film joining step is conducted after or concurrently with the film/shaped member joining step.

In the above manufacturing method of a hollow body product, the object is achieved preferably by a manufacturing method comprising: a resin impregnation step in which the fiber layer is impregnated with resin before, concurrently with, or after the fiber layer/film joining step; and a resin hardening step in which the resin in the fiber layer after the resin impregnation step is hardened before, concurrently with, or after the fiber layer/film joining step.

In the above manufacturing method of a hollow body product, the object is achieved preferably by a manufacturing method wherein the fiber layer is a fiber-reinforced resin prepreg sheet.

In the above manufacturing method of a hollow body product, the object is achieved preferably by a manufacturing method comprising a hardening step in which the fiber-reinforced resin prepreg sheet is hardened.

In the above manufacturing method of a hollow body product, the object is achieved preferably by a manufacturing method wherein the film arrangement step includes: a first adhesive film arrangement step in which a first adhesive film is arranged on the fiber layer; a film arrangement step in which a film is arranged on the first adhesive film after the first adhesive film arrangement step; and a second adhesive film arrangement step in which a second adhesive film is arranged on the film after the film arrangement step.

In the above manufacturing method of a hollow body product, the object is achieved preferably by a manufacturing method wherein the film is provided with an adhesive layer on its top and bottom.

In the above manufacturing method of a hollow body product, the object is achieved preferably by a manufacturing method wherein: the adhesive layer is an adhesive film, and the adhesive films are arranged on the top and bottom of the film.

In the above manufacturing method of a hollow body product, the object is achieved preferably by a manufacturing method comprising an opening step in which space in the concave part is connected with external space and thereby opened to pressure in the external space at a stage after the film/shaped member joining step and before the fiber layer/film joining step.

In the above manufacturing method of a hollow body product, the object is achieved preferably by a manufacturing method wherein the gas discharging step is a step in which gas in internal space covered with a bagging film is sucked out.

In the above manufacturing method of a hollow body product, the object is achieved preferably by a manufacturing method wherein the film has enough thermal resistance to avoid being damaged by heat in the joining steps.

In the above manufacturing method of a hollow body product, the object is achieved preferably by a manufacturing method wherein the film is substantially of the same size as the shaped member.

In the above manufacturing method of a hollow body product, the object is achieved preferably by a manufacturing method wherein the film covers the opening of the concave part of the shaped member.

In the above manufacturing method of a hollow body product, the object is achieved preferably by a manufacturing method wherein the shaped member has a hole formed at a position corresponding to the concave part.

According to the present invention, hollow body products can be manufactured with ease. Especially, the hollow body products can be manufactured even without using a core.

Further, in the production of hollow body products like the one shown in FIGS. 3 and 4, it becomes possible to conduct the formation of the lower-face plate and the joining of the upper-face plate and the lower-face plate substantially in a single step. Consequently, the hollow body products can be manufactured with extreme ease and at low costs.

DESCRIPTION OF THE PREFERRED EMBODIMENTS

Figure 3:
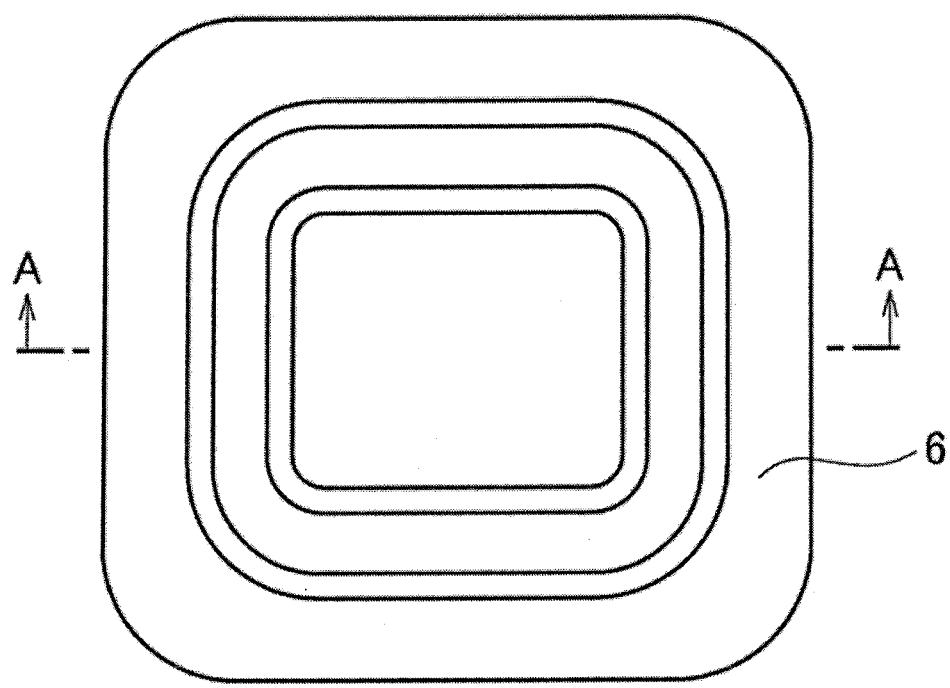
FIG. 3 is a plan view of the hollow body product.
Figure 4:
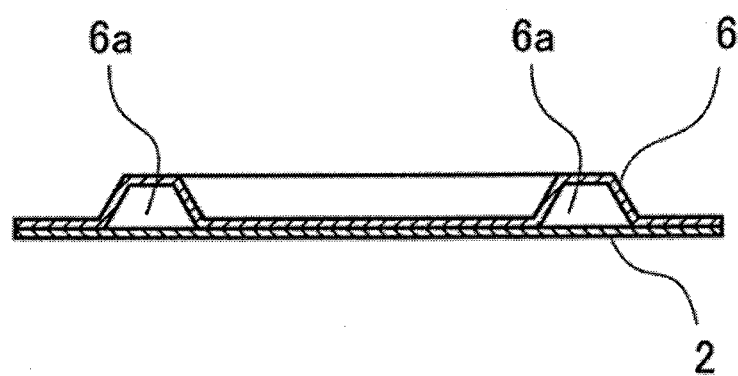
FIG. 4 is a cross-sectional view of the hollow body product.

The present invention provides a manufacturing method of a hollow body product. The hollow body product means, for example, a product like the one used for a landing gear door (see FIG. 3 and FIG. 4) of an aircraft.

The manufacturing method comprises a film arrangement step in which a film is arranged on a fiber layer. In the film arrangement step, a fiber layer impregnated with resin or not impregnated with resin may either be used. A fiber-reinforced resin prepreg sheet can be taken as an example of the fiber layer impregnated with resin.

The manufacturing method comprises a shaped member arrangement step in which a shaped member having a concave part is arranged on the film after the film arrangement step. In this step, the shaped member is arranged so that the opening of the concave part of the shaped member faces the film.

The manufacturing method comprises a fiber layer/film gas discharging step in which gas existing between the fiber layer and the film is discharged, and a film/shaped member gas discharging step in which gas existing between the film and the shaped member is discharged. After the fiber layer/film gas discharging step is finished, the pressure of the gas existing between the fiber layer and the film equals P1. After the film/shaped member gas discharging step is finished, the pressure of the gas existing between the film and the shaped member equals P2. Preferably, the gas discharging steps are executed so that P1<P2 is satisfied.

The manufacturing method comprises a film/shaped member joining step in which the film and the shaped member are joined together after the film/shaped member gas discharging step. The manufacturing method also comprises a fiber layer/film joining step in which the fiber layer and the film are joined together after the fiber layer/film gas discharging step. The fiber layer/film joining step is conducted after the film/shaped member joining step, or the two steps may also be conducted concurrently.

The fiber layer existing under the film does not have to be impregnated with resin in the film arrangement step. However, the fiber layer is desired to be impregnated with resin in a certain step. The resin impregnation step may be executed before the fiber layer/film joining step, for example. The resin impregnation step may also be executed concurrently with the fiber layer/film joining step or after the fiber layer/film joining step. The stage especially suitable for the resin impregnation step is immediately before, concurrently with, or immediately after the fiber layer/film joining step. More preferably, the resin impregnation step is executed at one of the above stages that is before the completion of the film/shaped member joining step. The resin which has infiltrated into the fiber layer is hardened at some point. The point of the hardening of the resin can be, for example, before, concurrently with, or after the fiber layer/film joining step. Preferably, the process is executed so that the hardening of the infiltrated resin proceeds in the fiber layer/film joining step (so that the hardening of the resin and the joining proceed in parallel in a concurrent manner). For example, the resin which has infiltrated into the fiber layer is hardened by heating, and meanwhile, the film and the fiber layer impregnated with the resin (fiber-reinforced resin plate) are bonded together and integrated. The same goes for the case where the fiber-reinforced resin prepreg sheet is used.

If the film to be arranged on the fiber layer in the film arrangement step has also an adhesive property, just using the film having such a feature is enough for the bonding. However, the adhesive property is generally achieved by using a thermosetting resin or a light-curable resin (hardened by ultraviolet rays or an electron beam). Even though the use of a film having its own adhesive property is enough for the bonding, the degree of freedom of film selection is lowered by such a restriction. Therefore, a technique separately preparing an adhesive film is desirable. For example, it is preferable to arrange a first adhesive film on the fiber layer, arrange a film on the first adhesive film, and arrange a second adhesive film on the film. Of course, it is also possible to prepare a laminated film, including an adhesive layer (adhesive film), a film and an adhesive layer (adhesive film) stacked up in this order, and arrange the laminated film on the fiber layer.

In the present invention, the pressure of the gas existing between the film and the shaped member is reduced by the aforementioned gas discharging step to P2 (the degree of vacuum: −722 Torr, for example). Thus, the pressure P2 is maintained in the film/shaped member joining step. However, the pressure P2 does not have to be maintained after the completion of the film/shaped member joining step or from a stage at which the joining step has proceeded to some extent (from a stage before the completion of the joining step). It is rather desirable at this stage to release the negative pressure in the space inside the concave part of the shaped member to the atmospheric pressure, since this allows substantially uniform force to act on the whole area of the film.

The gas discharging step is carried out by, for example, covering the shaped member with a bagging film and then sucking out (drawing, discharging) the gas existing in the internal space covered with the bagging film.

In the following, the present invention will be described in detail by taking some examples.

Figure 1:
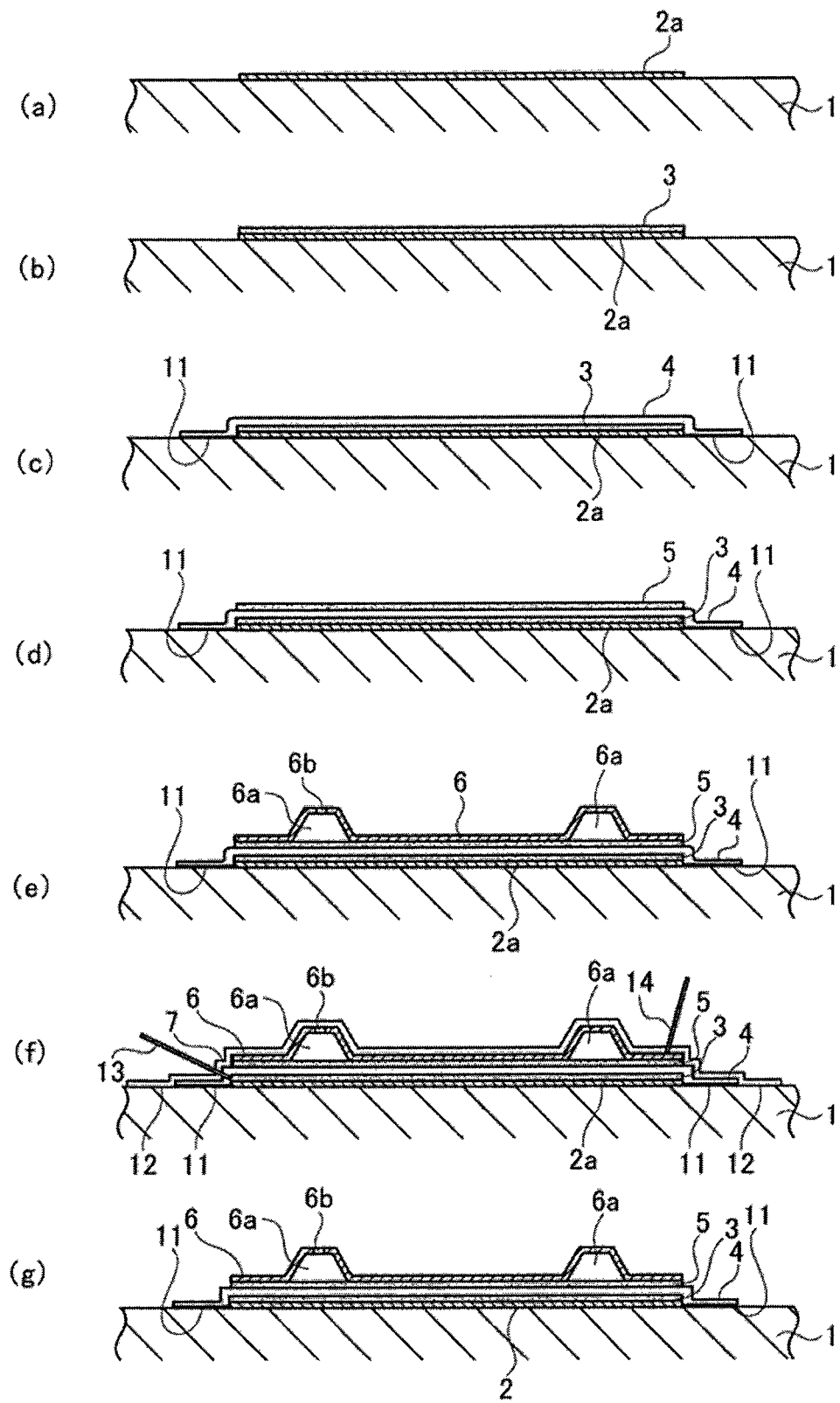
FIG. 1 is a manufacturing process diagram of a hollow body product in accordance with the present invention.

FIG. 1 is a manufacturing process diagram of a hollow body product (see FIGS. 3 and 4) in accordance with the present invention.

First, fiber 2a (material constituting a fiber-reinforced resin plate 2) was arranged on a base (jig) 1 (see FIG. 1(a)).

The fiber 2a is used for securing high rigidity. Fiber having a tensional elastic modulus of 100 GPa or higher is desirable.

While the upper limit of the tensional elastic modulus is not particularly restricted, the tensional elastic modulus should be not greater than 1000 GPa, for example, in consideration of the compressive strength, etc. Fiber having a tensional elastic modulus of approximately 200-850 GPa is especially desirable. For example, carbon fiber can be used as the fiber 2a. To achieve high rigidity and light weight, carbon fiber having a high specific modulus (the ratio between the elastic modulus and the density) is especially desirable. The carbon fiber may be implemented by polyacrylonitrile (PAN)-based carbon fiber, pitch-based carbon fiber, cellulosic carbon fiber, or vapor deposition carbon fiber using hydrocarbons, for example. Graphite fiber may also be used. Among these materials, PAN-based carbon fiber, excelling in the balance between the rigidity and the price, is especially desirable. The fiber 2a may also be implemented by glass fiber, organic high elasticity modulus fiber (polyester fiber, acrylic fiber, polyolefin fiber, vinylon fiber, polyamide fiber, "Kevlar" (polyaramide fiber from E. I. du Pont de Nemours and Company), etc.), alumina fiber, silicon carbide fiber, boron fiber, silicon carbide fiber, etc. The fiber 2a may be fiber stretched in one direction. However, the fiber 2a is desired to have two or more directions of fibers. Thus, the fiber 2a in the present invention is desired to be a fabric (fabric made of fibers). For example, a fabric such as a plain weave, a twill weave, a leno weave or a satin weave is preferably employed. In this embodiment, the fiber 2a is implemented by a fabric made of PAN-based carbon fiber.

Subsequently, an adhesive film 3 (e.g., film made of thermosetting resin such as epoxy resin) was arranged on the fiber 2a (see FIG. 1(b)).

The adhesive film 3 has high adhesivity to a fiber-reinforced resin plate 2 which will be explained later (fiber-reinforced resin plate including the fiber 2a impregnated with resin) and to a film 4 which will be explained later. In this embodiment, the adhesive film 3 is provided from the viewpoint of adhesivity between the fiber-reinforced resin plate 2 and the film 4. Incidentally, there may be cases where the adhesive film 3 is left out depending on the circumstances.

Thereafter, the film 4 was arranged to cover the fiber 2a and the adhesive film 3 (see FIG. 1(c)).

The film 4 is made of polyimide, and thus the film 4 has low gas permeability. Therefore, after conducting the vacuum suction to a degree of vacuum of approximately −760 Torr, for example, the degree of vacuum does not drop in a short period of time. Further, the film 4 is not damaged by heat in a heating step (adhesion step, resin hardening step) which will be explained later. The film 4 is resistant to high temperature of approximately 180° C., for example. Furthermore, the film 4 has high adhesivity also to the adhesive film 3. Other suitable materials for the film 4 having such features may include polyester, nylon and polyetherimide, for example.

Incidentally, a sealant 11 is arranged between the base 1 and the film 4, that is, a hermetic structure is formed with the sealant 11. Thus, after the air in the space covered with the film 4 has been sucked out (discharged), the space covered with the film 4 is kept in a high vacuum state.

Thereafter, an adhesive film 5 (e.g., film made of thermosetting resin such as epoxy resin) was arranged on the film 4 (see FIG. 1(d)).

The adhesive film 5 has high adhesivity to the film 4 and to a shaped member 6 which will be explained below.

Subsequently, the shaped member 6 was arranged on the adhesive film 5 (see FIG. 1(e)).

The shaped member 6 has a concave part 6a. The concave part 6a is formed from the viewpoint of improving the mechanical strength, etc. of the product to be manufactured.

A hole 6b connecting to the space inside the concave part 6a is formed. The shaped member 6 is arranged so that the opening of the concave part 6a faces the film 5 (see FIG. 1(e)).

The shaped member 6 is formed of fiber-reinforced resin, for example, to achieve high rigidity and light weight. The fiber constituting the fiber-reinforced resin may be selected from the aforementioned fibers, for example. As the resin constituting the fiber-reinforced resin (matrix resin), thermosetting resin or thermoplastic resin can be employed, for example. Specifically, epoxy resin, phenolic resin, unsaturated polyester resin, vinyl ester resin, ABS resin, polyethylene terephthalate resin, nylon resin, cyanate resin, benzoxazine resin, maleimide resin, polyimide resin, etc. can be used, for example. Preferably, thermosetting resin such as epoxy resin is used. In short, resin that is hardened by energy (e.g., heat or light (ultraviolet rays or an electron beam)) from the outside and thereby forms a three-dimensional hardened material may be used.

Thereafter, the whole of the above structure was covered with a bagging film 7 (see FIG. 1(f)).

Incidentally, a sealant 12 is arranged between the base 1 and the bagging film 7, that is, a hermetic structure is formed with the sealant 12. Thus, after the air in the space covered with the bagging film 7 has been sucked out (discharged), the space covered with the bagging film 7 is kept in a high vacuum state.

Subsequently, the air in the space covered with the film 4 (the space surrounded by the base 1 and the film 4) was sucked out (discharged) through a tube 13. By this step, the degree of vacuum reached −760 Torr (displayed as gauge pressure with respect to the atmospheric pressure represented as 0). At this stage, the fiber 2a and the film 4 have not been bonded together yet. Thus, the air existing in the gap between the fiber 2a and the film 4 is also sucked and discharged.

Thereafter, the air in the space covered with the bagging film 7 (the space surrounded by the film 4 and the bagging film 7) was sucked out (discharged) through a tube 14. By this step, the degree of vacuum reached −722 Torr. At this stage, the film 4 and the shaped member 6 have not been bonded together yet. Thus, the air existing in the space in the concave part 6a is also sucked and discharged. Therefore, the degree of vacuum in the space in the concave part 6a equals −722 Torr.

Incidentally, it is also possible to first conduct the suction (discharging) so that both the degree of vacuum in the space covered with the film 4 and the degree of vacuum in the space covered with the bagging film 7 reach −760 Torr and thereafter let the degree of vacuum in the concave part 6a fall to −722 Torr.

In this example, the condition (pressure P1 in the space surrounded by the base 1 and the film 4)<(pressure P2 in the space surrounded by the film 4 and the bagging film 7 (i.e., the pressure in the concave part 6a)) is employed for the following reason: Suppose P1>P2 holds, the film 4 covering (closing) the concave part 6a becomes depressed toward the concave part 6a due to the differential pressure. In this case, the film 4 has a high probability of wrinkling. The wrinkling of the film 4 can deteriorate the adhesivity. For this reason, the suction (discharging) was conducted so as to satisfy the condition P1<P2.

Thereafter, the above structure was heated at a prescribed temperature, by which the adhesion by the adhesive film 5 was started. In a certain time period (X hours) since the start of the heating, the film 4 and the shaped member 6 were completely bonded together and integrated.

After the film 4 and the shaped member 6 were bonded together and integrated along the elapse of a prescribed time period (a time period shorter than the aforementioned X hours, that is, a time period that is not long enough for the perfect bonding/integration of the film 4 and the shaped member 6 but long enough for achieving the bonding/integration of the film 4 and the shaped member 6 to a level at which the peeling off of the film 4 can be avoided even when pressure acts on the film 4 due to the subsequent introduction of air into the concave part 6a) since the start of the heating, the concave part 6a was opened to the outside via the hole 6b and air was introduced into the concave part 6a. By the introduction of air, the atmospheric pressure starts acting on the whole surfaces of the fiber 2a and the film 4 from the shaped member's side. It is also possible to put the structure in a pressurized furnace and pressurize the structure to a pressure above the atmospheric pressure.

After the introduction of air into the concave part 6a, while evacuating the space surrounded by the base 1 and the film 4 and keeping the space in a high vacuum state, the fiber 2a was impregnated with a solution of resin (matrix resin) at a prescribed temperature. The resin impregnation was conducted before the film 4 and the shaped member 6 were completely bonded together and integrated. The heating was continued at a prescribed temperature even after the resin impregnation, by which the matrix resin was hardened completely. By the heating, the resin that had infiltrated into the fiber 2a was hardened to form the fiber-reinforced resin plate 2. Along with the hardening, the bonding by the adhesive film 3 proceeded completely, by which the fiber-reinforced resin plate 2 and the film 4 were completely bonded together and integrated. Thereafter, the tubes 13 and 14 were removed (see FIG. 1(g)), by which the hollow body product (see FIGS. 3 and 4) was obtained.

Incidentally, while the fiber 2a was used in the above embodiment, there are cases where a fiber-reinforced resin prepreg is used instead of the fabric (fiber) 2a. In this case, the resin impregnation step explained in the above embodiment is left out. Thus, the heating at the prescribed temperature was conducted even after the introduction of air into the concave part 6a. By the heating, the matrix resin contained in the fiber-reinforced resin prepreg was hardened completely and the fiber-reinforced resin plate 2 was formed. Along with the hardening, the bonding by the adhesive film 3 proceeded completely, by which the fiber-reinforced resin plate 2 and the film 4 were completely bonded together and integrated. Finally, the hollow body product (see FIGS. 3 and 4) was obtained.

While the adhesive films 3 and 5 are of the same type in the above embodiment, it is also possible to use an adhesive film having a higher curing temperature than the adhesive film 5 as the adhesive film 3. In this case, it is possible to first complete the hardening/bonding of the adhesive film 5 by heating the film at a temperature T1 and thereafter complete the hardening/bonding of the adhesive film 3 by heating the film at a temperature T2 (T2>T1). After the completion of the bonding/integration of the film 4 and the shaped member 6, the resin impregnation may be carried out after opening the hole 6b for the connection to the outside.

Figure 2:
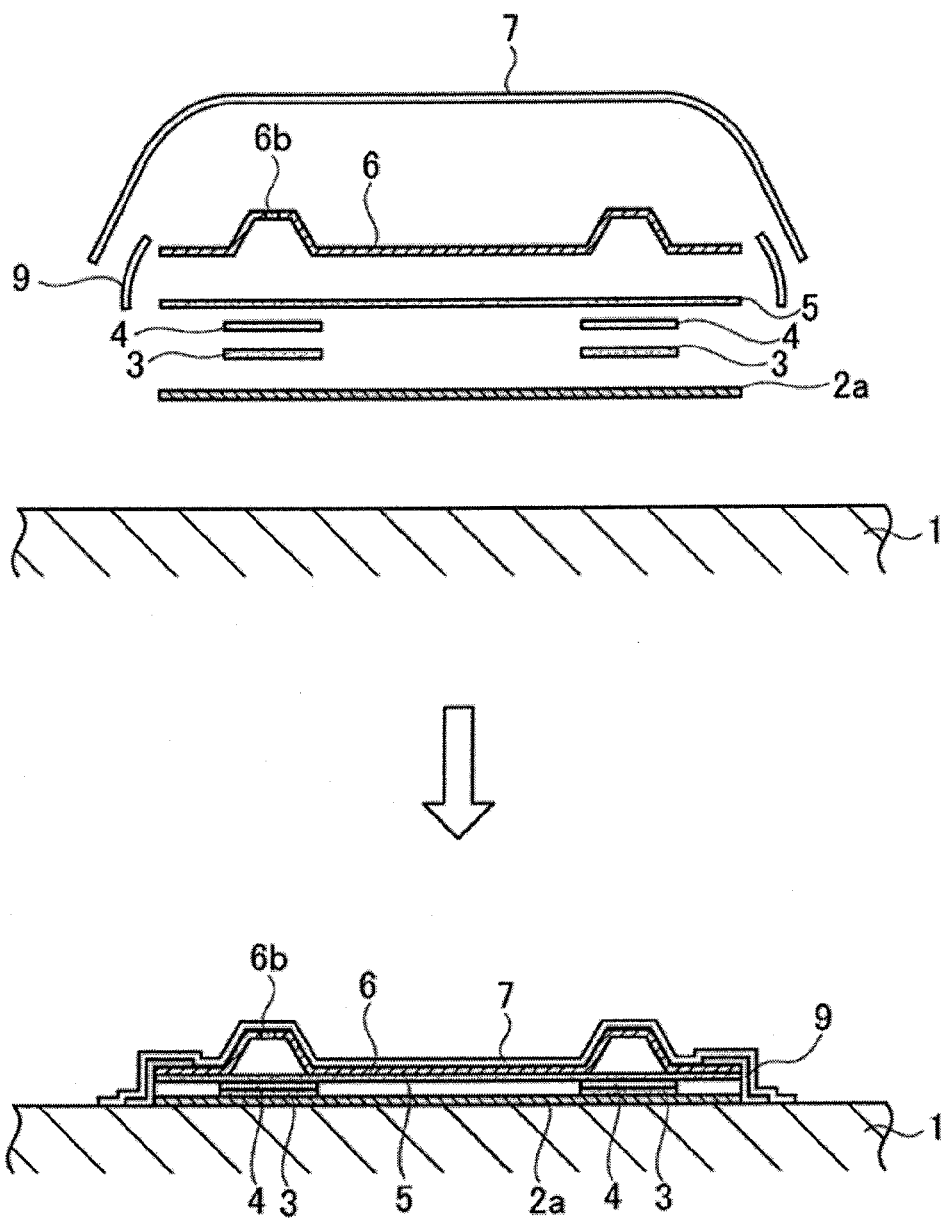
FIG. 2 is a manufacturing process diagram of a hollow body product in accordance with another embodiment of the present invention.

While the film 4 and the shaped member 6 are substantially of the same size in the above embodiment, the film 4 may also be implemented by a film that barely covers the opening of the concave part 6a (see FIG. 2). In this case, the adhesive film 3 may also be implemented by a film substantially in the same size as the film 4. In this case, however, the degree of vacuum between the fiber 2a and the film 4, 4 is set higher than that in the concave part 6a by arranging a bagging film 9.

REFERENCE CHARACTER LIST 1 base
2a fabric (fiber)
2 fiber-reinforced resin plate
3 adhesive film
4 film
5 adhesive film
6 shaped member
6a concave part
6b hole
7 bagging film
11, 12 sealant
13, 14 tube

The invention claimed is:

1. A manufacturing method of a hollow body product, comprising:
   a film arrangement step in which a film is arranged on a fiber layer;
   a shaped member arrangement step in which a shaped member having a concave part is arranged on the film after the film arrangement step so that an opening of the concave part faces the film;
   a fiber layer/film gas discharging step in which gas existing between the fiber layer and the film is discharged;
   a film/shaped member gas discharging step in which gas existing between the film and the shaped member is discharged;
   a film/shaped member joining step in which the film and the shaped member are joined together after the film/shaped member gas discharging step;
   a fiber layer/film joining step in which the fiber layer and the film are joined together after the fiber layer/film gas discharging step; and
   wherein the discharging of the gas in the gas discharging steps is executed so that a condition (pressure P1 of the gas existing between the fiber layer and the film) <(pressure P2 of the gas existing between the film and the shaped member) is satisfied.

2. A manufacturing method of a hollow body product according to claim 1, wherein the fiber layer/film joining step is conducted after or concurrently with the film/shaped member joining step.

3. A manufacturing method of a hollow body product according to claim 1, comprising:
   a resin impregnation step in which the fiber layer is impregnated with resin before, concurrently with, or after the fiber layer/film joining step; and
   a resin hardening step in which the resin in the fiber layer after the resin impregnation step is hardened before, concurrently with, or after the fiber layer/film joining step.

4. A manufacturing method of a hollow body product according to claim 1, wherein the fiber layer is a fiber-reinforced resin prepreg sheet.

5. A manufacturing method of a hollow body product according to claim 4, comprising a hardening step in which the fiber-reinforced resin prepreg sheet is hardened.

6. A manufacturing method of a hollow body product according to claim 1, wherein the film arrangement step includes:
   a first adhesive film arrangement step in which a first adhesive film is arranged on the fiber layer;
   a film arrangement step in which a film is arranged on the first adhesive film after the first adhesive film arrangement step; and
   a second adhesive film arrangement step in which a second adhesive film is arranged on the film after the film arrangement step.

7. A manufacturing method of a hollow body product according to claim 1, wherein the film is provided with an adhesive layer on its top and bottom.

8. A manufacturing method of a hollow body product according to claim 7, wherein: the adhesive layer is an adhesive film, and the adhesive films are arranged on the top and bottom of the film.

9. A manufacturing method of a hollow body product according to claim 1, comprising an opening step in which space in the concave part is connected with external space and thereby opened to pressure in the external space at a stage after the film/shaped member joining step and before the fiber layer/film joining step.

10. A manufacturing method of a hollow body product according to claim 1, wherein the gas discharging step is a step in which gas in internal space covered with a bagging film is sucked out.

11. A manufacturing method of a hollow body product according to claim 1, wherein the film has enough thermal resistance to avoid being damaged by heat in the joining steps.

12. A manufacturing method of a hollow body product according to claim 1, wherein the film is substantially of the same size as the shaped member.

13. A manufacturing method of a hollow body product according to claim 1, wherein the film covers the opening of the concave part of the shaped member.

14. A manufacturing method of a hollow body product according to claim 1, wherein the shaped member has a hole formed at a position corresponding to the concave part.

* * * * *